US 9,143,566 B2

(12) United States Patent
Aviles et al.

(10) Patent No.: US 9,143,566 B2
(45) Date of Patent: Sep. 22, 2015

(54) NON-DISRUPTIVE STORAGE CACHING USING SPLICED CACHE APPLIANCES WITH PACKET INSPECTION INTELLIGENCE

(75) Inventors: Joaquin J. Aviles, Austin, TX (US); Mark U. Cree, Austin, TX (US); Gregory A. Dahl, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 2070 days.

(21) Appl. No.: 12/015,197

(22) Filed: Jan. 16, 2008

(65) Prior Publication Data

US 2009/0182835 A1    Jul. 16, 2009

(51) Int. Cl.
*G06F 15/167*  (2006.01)
*H04L 29/08*  (2006.01)
*G06F 12/08*  (2006.01)
*G06F 3/06*  (2006.01)
*G06F 12/12*  (2006.01)

(52) U.S. Cl.
CPC ........ *H04L 67/1097* (2013.01); *G06F 12/0813* (2013.01); *G06F 12/0866* (2013.01); *H04L 67/28* (2013.01); *H04L 67/2852* (2013.01); *G06F 3/0611* (2013.01); *G06F 12/123* (2013.01)

(58) Field of Classification Search
CPC .................................................. H04L 67/1097
USPC ........................... 709/213, 203, 245; 711/118
See application file for complete search history.

(56) References Cited

U.S. PATENT DOCUMENTS

| 6,775,695 | B1 * | 8/2004 | Sarukkai ........................ 709/219 |
| 7,330,908 | B2 * | 2/2008 | Jungck ............................ 709/246 |
| 7,409,433 | B2 * | 8/2008 | Lowery et al. ................. 709/214 |
| 2003/0169749 | A1 * | 9/2003 | Huang et al. ................... 370/401 |
| 2007/0124577 | A1 * | 5/2007 | Nielsen et al. ................. 713/151 |

* cited by examiner

*Primary Examiner* — Peter Shaw
(74) *Attorney, Agent, or Firm* — Mahamedi Paradice LLP

(57) ABSTRACT

A method, system and program are disclosed for accelerating data storage by providing non-disruptive storage caching using spliced cache appliances with packet inspection intelligence. A cache appliance that transparently monitors NFS and CIFS traffic between clients and NAS subsystems and caches files using dynamically adjustable cache policies provides low-latency access and redundancy in responding to both read and write requests for cached files, thereby improving access time to the data stored on the disk-based NAS filer (group).

7 Claims, 4 Drawing Sheets

US 9,143,566 B2

NON-DISRUPTIVE STORAGE CACHING USING SPLICED CACHE APPLIANCES WITH PACKET INSPECTION INTELLIGENCE

BACKGROUND OF THE INVENTION

1. Field of the Invention

The present invention is directed in general to the field of computer storage networks. In one aspect, the present invention relates to a standalone cache memory device which is connected between one or more host machines and a storage device.

2. Description of the Related Art

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device.

While a number of solutions have been proposed to address these problems, they are, for a variety of reasons, not entirely satisfactory. For example, increases in the size and speed of the cache memory result in increased costs. And while faster disk drives have been developed, the increased disk drive access speeds are not enough to overcome the performance gap. Other solutions have proposed using performance-oriented data placement, but these have provided only limited performance gains. Attempts to increase response speed by using disk striping across multiple RAID disks have not proven to be scalable or have otherwise suffered from proprietary limitations. And while parallel file systems with virtualization have been able to provide short-term performance gains, they are massively complex and difficult to implement. Accordingly, there is a need for a system and method for improving the disk storage access time to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided for dynamically caching files by monitoring NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire.

In accordance with various embodiments, a data operation (such as a request to read or write a file from a networked storage device) may be cached or serviced by a non-disruptive storage cache which uses packet inspection intelligence to splice connections under software control using the methodologies and/or apparatuses described herein, which may be implemented in a standalone cache appliance with computer program code comprising computer executable instructions. In whatever form implemented, a standalone cache unit receives a request from a remote client to perform a specified data operation at one or more networked data storage devices. The standalone cache unit is configured to splice connections between the remote client and the networked data storage devices, such as by splicing some, but not all, of all of the packet parameters in the TCP/IP stack so as to be transparent to the L3 and L4 network layers defining a connection between the remote client and the networked data storage device(s). For example, in a selected embodiment, the standalone cache unit splices only a connection state, a source sequence number and a destination sequence number in an L4 layer defining a connection between the remote client and the networked data storage device(s). In addition, the standalone cache unit inspects packet parameters in each TCP/IP stack layer associated with the request and determines if the request can be serviced by a cache memory located at the standalone cache unit. In selected embodiment, the packet parameters are inspected by transparently monitoring NFS and CIFS traffic between the remote client and the one or more networked data storage devices. If the request can not be serviced by the cache memory, the request is forwarded to the one or more networked data storage devices for further processing. However, if the request can be serviced by the cache memory, the specified data operation is performed by caching files in the cache memory located at the standalone cache unit using a predetermined cache policy, such as a least recently used with dual time reference algorithm aided with greedy dual size frequency algorithm. In addition or in the alternative, the files may be cached in the cache memory located at the standalone cache unit using dynamically adjustable cache policies that reflect application workloads that change over time.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and program are disclosed for accelerating data storage access by caching selected data in a scalable, stand-alone, high-performance memory-based device that transparently monitors NFS and CIFS traffic between clients and NAS subsystems and caches files using dynamically adjustable cache policies that reflect the business requirements and/or application workloads that change over time. In selected embodiments, one or more cache appliances may be connected in front of an NAS filer (group) to provide low-latency access and redundancy in responding to both read and write requests for cached files, thereby improving access time to the data stored on the disk-based NAS filer (group).

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
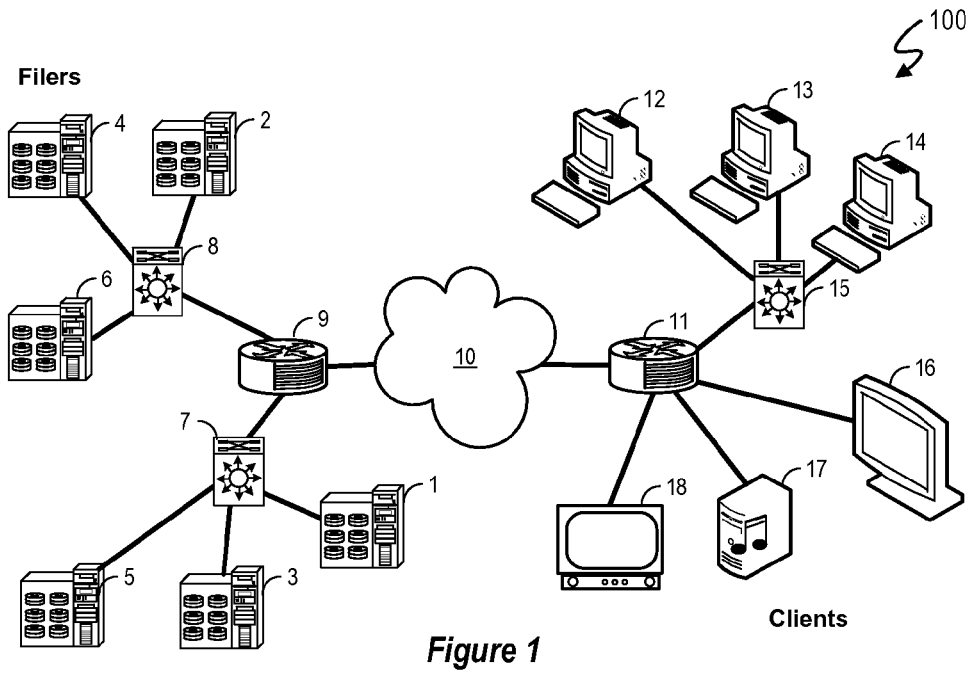
FIG. 1 depicts a typical NAS system in which client devices use a network to access storage resources on a number of remote network attached storage and file servers.
Figure 2:
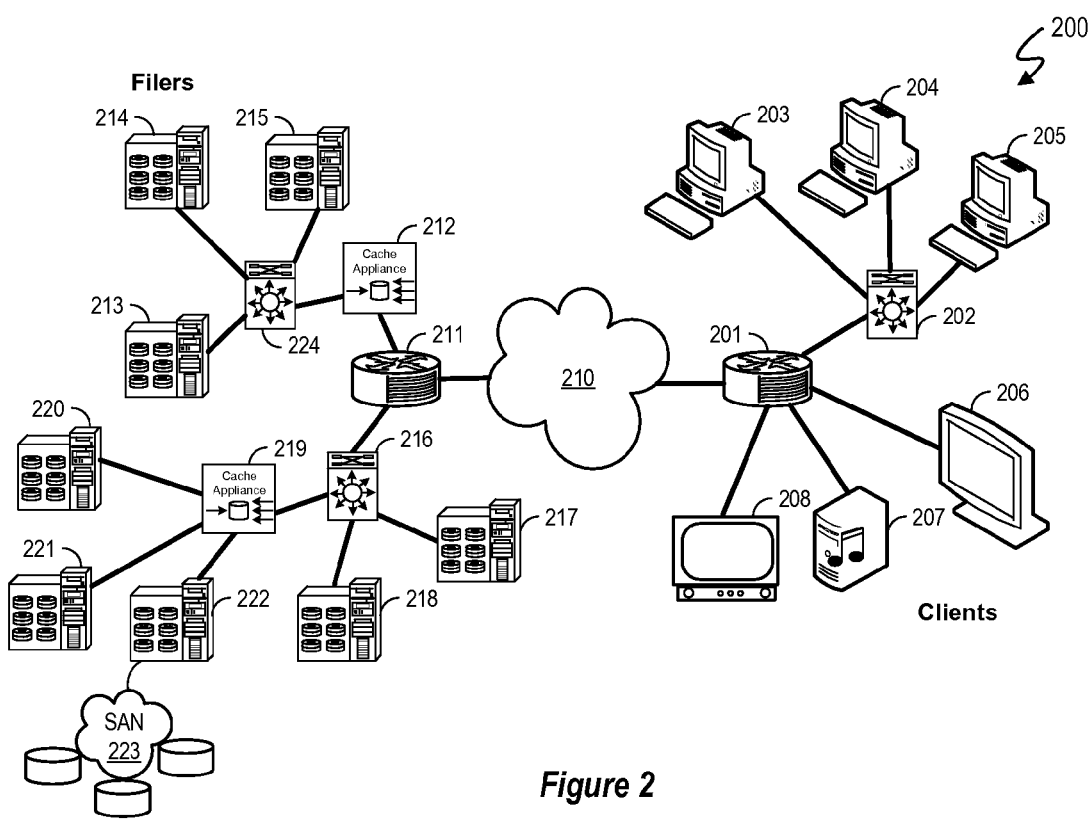
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server (e.g., 222) or a file server group (e.g., 213-215). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g., 212) may include one or more cache appliances that are connected or clustered together and working in tandem to form a single homogeneous caching device, as described more in co-pending patent application entitled "Clustered Cache Appliance System and Methodology" filed on Jan. 16, 2008 and incorporated by reference as if set forth fully herein. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cache appliance is modified through an alternate path.

When provided with packet inspection capability, each cache appliance 212, 219 is able to inspect the packet information in each of the TCP/IP stack layers to determine the physical port information for the sender and receiver from the L2 datalink layer, the logical port information for the sender and receiver from the L3 network layer, the TCP/UDP protocol connection information from the L4 transport layer, and the NSF/CIFS storage protocol information from the L5 session layer. In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
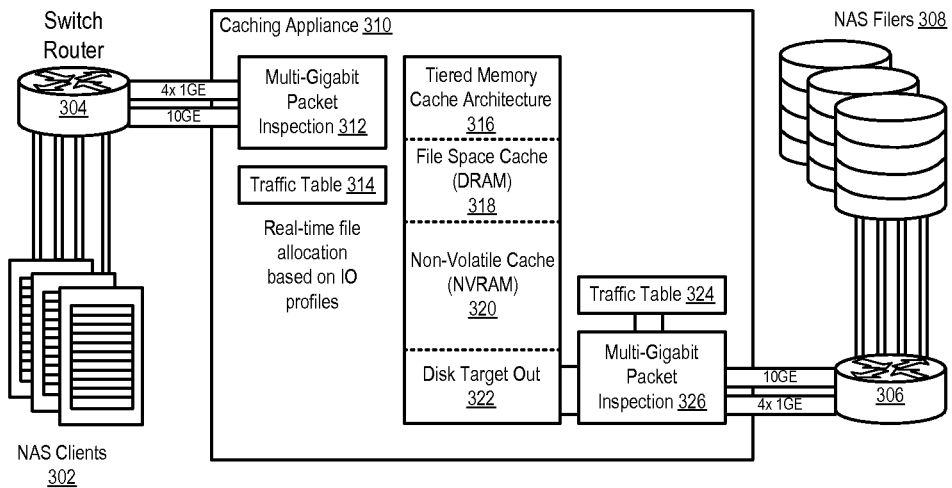
FIG. 3 depicts the functional operation of a non-disruptive storage cache appliance with packet inspection intelligence.

The functional operation of the packet inspection intelligence in the cache appliance may be described with reference to FIG. 3 which depicts the functional operation of a non-disruptive storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. For example, if the NAS client 302 requests application data that is stored on the cache appliance 310, the packet inspection hardware 312 may process the request by using an upstream traffic table 314 to perform real-time file allocation base on I/O profiles. If the packet inspection indicates that the request is to be processed by the cache appliance 310, the request is passed internally to the tiered memory cache system 316 which controls the cache storage into tiers. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a volatile or dynamic random access memory (DRAM) 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 324 to inspect the packets of incoming responses to determine if they should be passed inward for further processing by the cache appliance 310 or forwarded to another destination. For example, if the NAS filer 308 returns application data in response to a read request, the packet inspection hardware 326 may process the response for possible caching at the cache appliance 310 by using a downstream traffic table 314 to perform real-time file allocation base on I/O profiles. If the packet inspection indicates that the request is to be processed by the cache appliance 310, the request is passed internally to the tiered memory cache system 316 which controls the cache storage into tiers.

Figure 4:
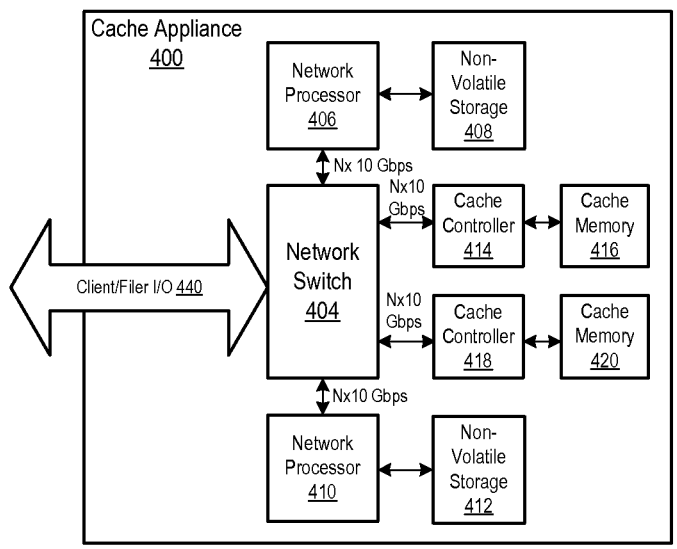
FIG. 4 is a block diagram of a cache appliance which may be used in connection with selected embodiments of the present invention.

As described herein, the cache appliance is the fundamental element of the data storage cache system, and is implemented as a combination of a high-speed packet processor and a large cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and cache memory component for storing cached data files.

The central element of the cache appliance hardware 400 is a high-speed network switch 404. The network switch 404 provides client and filer interfaces and multiple 10 Gbps connections to the packet processing and cache controller hardware. The network switch 404 manages data flow between the client/filer I/O ports 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, packet processing, cache management, and client/filer communication. In a selected embodiment, two NPUs 406, 410 are provided, where each NPU may be implemented as a multi-threaded multi-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial cache memory for storing data files. To control the cache memory, the cache appliance hardware 400 includes a cache controller for each cache memory. In a selected embodiment, two cache controllers 414, 418 are provided, respectively for each volatile cache memory 416, 420. With the volatile cache memory units 416, 420, a substantial amount of dynamic random access memory (DRAM) (e.g., 64 Gigabyte) may be provided. Each cache controller 414, 418 is responsible for connecting both the dynamic cache memory and the non-volatile storage to the high-speed interconnect within the cache appliance. In addition, the cache controllers 414, 418 may offload some cache memory lookup and coherency functions from the network processors 406, 410.

Figure 5:
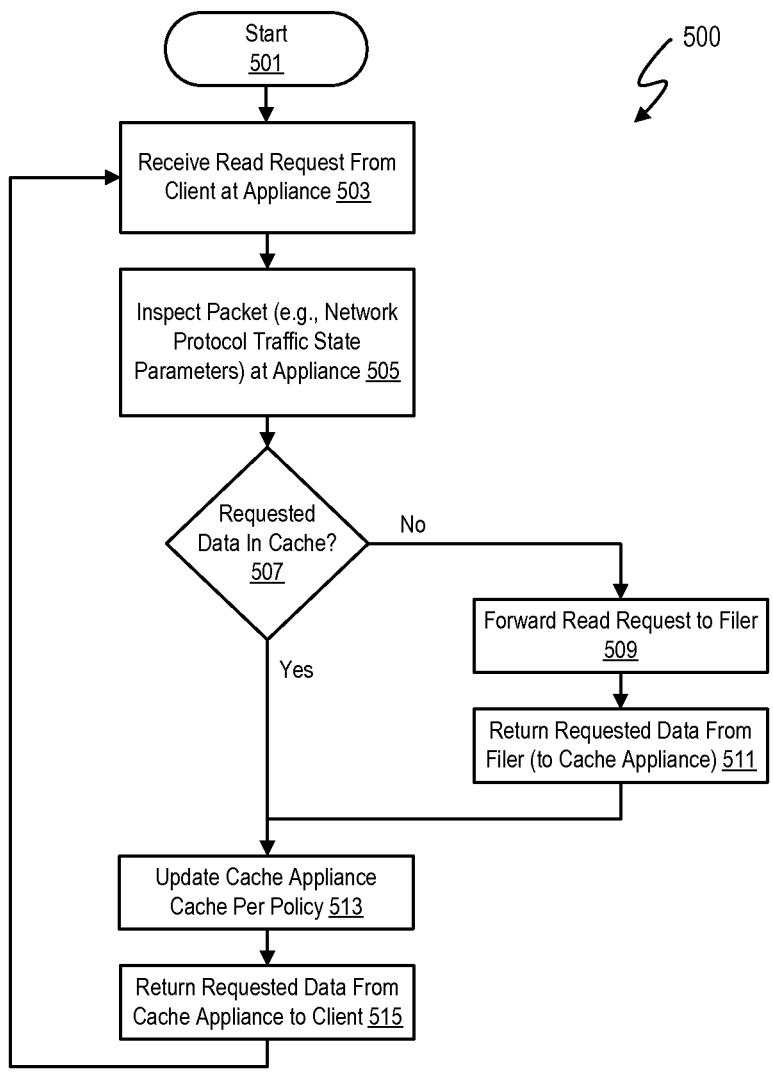
FIG. 5 depicts an example process flow sequence for caching storage data using spliced connections.

Turning now to FIG. 5, there is depicted an example process flow 500 for caching storage data at a cache appliance using spliced connections. The process starts (step 501), such as when a cache appliance is positioned between the storage clients and the NAS filers. In operation, the cache appliance operates to intercept all requests between the clients and filers and provide read and write cache acceleration by storing and recalling frequently used information. After receiving a read request from a client (step 503), the cache appliance inspects the packet information associated with the request (step 505) to obtain information for moving the packet through the system (e.g., network protocol traffic state parameters). The inspected information is used to identify packets that need to be processed by the cache appliance, as well as packets that are to be forwarded by the cache appliance. By snooping network protocol traffic state parameters and splicing connections between filers and clients, the cache appliance provides Open System Interconnect (OSI) transparency, thereby performing in the Ethernet network as a bump-in-the-wire. Based on the inspected information, the cache appliance checks to see if the requested data is present within the appliance's cache memory. If so (affirmative outcome to decision 507), this is considered a read cache-hit and the request is satisfied directly from the appliance's cache memory (step 515) before or after updating the cache memory pursuant to the cache replacement policy (step 513). Otherwise, this is a read cache-miss (negative outcome to decision 507) and the cache appliance forwards the read request to the filer (step 509). The data returned by the filer (step 511) may be cached in one or more cache blocks in the appliance's cache memory so that the read request can be satisfied from the cache appliance (step 513). Finally, the cache block is promoted based on the cache replacement algorithm (step 515). Any desired cache population algorithm for page replacement and cache eviction may be used to populate the cache memory in the cache appliance, including, for example, a least recently used (LRU) algorithm (e.g., LRU-K or LRU-2), a least frequently used (LFU), a least recently/frequently-used (LFRU) algorithm, an adaptive replacement cache (ARC) algorithm, a multiqueue (MQ) replacement algorithm, the 2Q algorithm which uses two queues to separate hot and cold items, a low inter-reference recency set (LIRS) algorithm.

Figure 6:
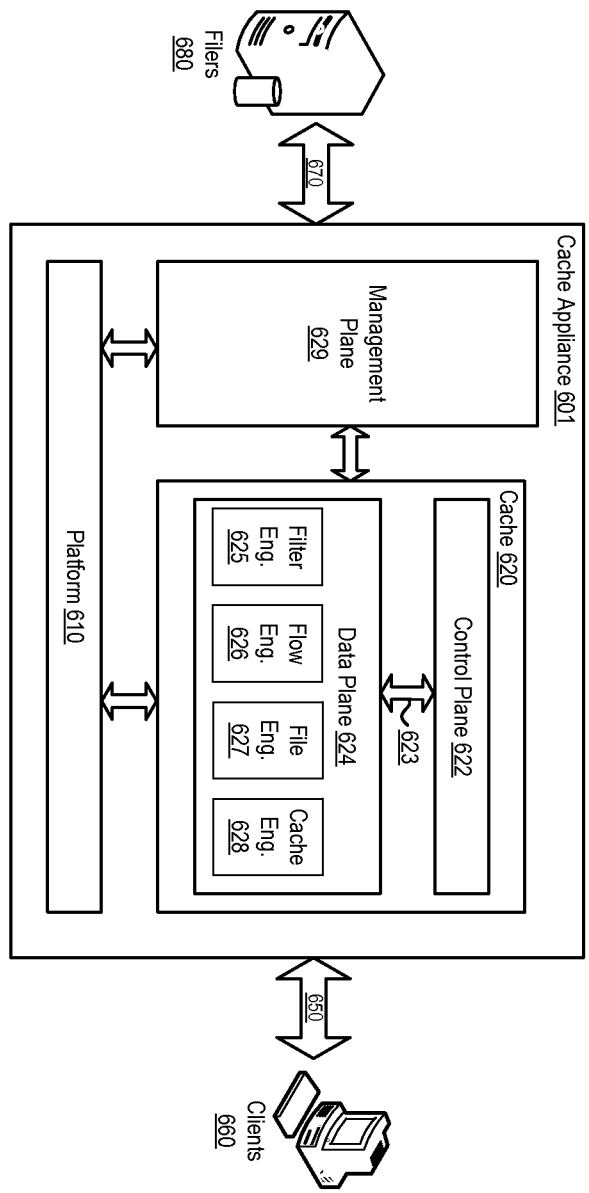
FIG. 6 depicts the overall system architecture of a non-disruptive storage cache appliance.

To illustrate the constituent component functionality of the cache appliance, reference is made to FIG. 6 which depicts the overall system architecture of a non-disruptive storage cache appliance. The depicted architecture is divided into two logical components, including the platform component 610 and the cache component 620, and configured to receive and process packets from the clients 660 and filers 680 that are sent over the connection interfaces 650, 670.

The platform component 610 includes the hardware and system software components that come together to form the basis of the system. As described hereinabove, the hardware in the platform component 610 includes the individual cache appliance (described above with reference to FIG. 4) which provides network interfaces, packet processing and cache memory. The software in the platform component 610 includes a boot loader component (for bringing the appliance to a minimal operating state), an operating system component (to provide for process scheduling, memory allocation, network, and flash file system facilities) and drivers (for extending the OS functionality and provide access to required hardware).

The cache component 620 includes the embedded software that runs on the cache appliance to implement the caching functionality on the appliance 601. By having the appliance 601 servicing I/O requests from the cache 620, responses to clients 660 are accelerated. As illustrated, the cache component software 620 includes a data plane section 624 which performs the required packet processing functions on a packet so that each packet can progress through the cache appliance 601. In other words, if something must be performed to progress a packet through the system, then it is a data plane activity. The data plane 624 processes received client and filer traffic through a pipeline of operations. At any point during the processing, the data plane 624 may forward a packet out from the cache component 620 because it is finished servicing the operation, or the packet is not pertinent to the system, or for other reasons.

The cache component software 620 also includes a control plane section 622 which performs the required processing functions about a packet to facilitate the data plane or that is not required in order to process a packet. In other words, the control plane section 622 stores control information that affects the data plane 624. If any stimulus outside of a packet traversing the system requires an operation, then it is a control plane activity. The control plane 622 is composed of stand-alone data structures as well as a set of managers that themselves may contain their own data structures. The interaction between the control plane 622 and the data plane 624 is via the interface 623 which can be take several forms, such as function calls, IPC requests, or direct access into a data structure's memory. As packets progress through the system, the data plane 624 queries the control plane 622 to help it perform its operations. The data plane 624 conversely sends information to the control plane 622 that it may either need in subsequent operations or that provide information to the management functions of the system. In addition, the cache component software 620 includes a management plane section 629 which performs various ancillary functions on the system that do not affect the processing of packets or that is on demand from a remote management server.

In operation, the data plane 624 includes a packet filter engine 625 that inspects received packets to identify the packets that need to be processed by the cache appliance 601, and forwards all other packets to an exit interface 650, 670. This action minimizes the impact of non-relevant packets on system resources. There are two types of packets that must be identified for further processing: cache appliance IPC packets and client/filer packets. Cache appliance IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 624 also includes a flow engine 626 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is TCP connection state for tracking sequence numbers, retransmits, etc. As from implementing split TCP connections, this occurs when the cache appliance 601 becomes a man-in-the-middle on a connection when a request (e.g., an NFS read) is intercepted and served from local cache. The flow manager implements the logic needed to be a man-in-the-middle on a split connection.

A file engine 627 in the data plane 624 handles layer 5-7 NFS, mount, CIFS, HTTP, FTP, and port mapper transactions that are used to perform protocol decode, file lookup, and transaction processing operations. In protocol decode operations, the protocol messages are delineated and decoded based on a protocol content type that is determined by the flow engine. After decode, a file lookup operation is performed using a reverse lookup of the internal file record based on filer and a protocol-specific file reference. This provides the file-specific information needed to process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 624 includes a cache engine 628 that provides fault-tolerant block-level file caching. File requests are translated into cache block accesses. A cache block is a unit of memory that is dedicated to storing file data. The blocks reside within the cache appliance memory. Even though NAS protocols are file-based, cache management may be simplified by superimposing a block approach.

As disclosed herein, the packet inspection capability enables connection splicing so that the cache appliance can be inserted between filers and filer's clients or users without having to change mount points and network addresses, implementation data migration and network topology. By momentarily interrupting the logical network connection between filers and its clients, the cache appliance may be installed along with one more network switches may be installed in the physical path. Once the cache appliance is installed, it commences operation by identifying active network connections traveling along the physical path between the filers and filer's client(s).

By now it should be appreciated that there has been provided a method and system for caching data operations in a standalone cache unit that are requested from one or more networked data storage devices by one or more remote clients. As disclosed, the cache unit includes a cache memory for caching data that is requested by a remote client, and a high-speed packet processor coupled to the cache memory and to one or more I/O ports for splicing connections between the data storage devices and remote clients, where the high-speed packet processor inspects network protocol traffic state parameters received on the I/O ports to determine if a request from a remote client can be serviced by the cache memory. In operation, the high-speed packet processor executes software that transparently monitors NFS and CIFS traffic between remote clients and NAS subsystems and caches files using a predetermined cache policy, such as a least recently used with dual time reference algorithm aided with greedy dual size frequency algorithm. The high-speed packet processor may also be configured to splice connections between the data storage devices and remote clients by splicing only a part of a TCP/IP layer stack defining a connection, such as by splicing connections between the data storage devices and remote clients so as to be transparent to L3 and L4 network layers defining a connection. The standalone cache unit may also include a network switch interconnect coupled between the I/O port(s), the high-speed packet processor and the cache memory for routing network protocol traffic from the data storage devices and remote clients. In addition, the standalone cache unit may include a cache controller coupled to the cache memory for servicing read and write requests from a remote client with data stored on cache memory. When the standalone cache unit is connected in-line between the remote clients and the one or more networked data storage devices, it is positioned to intercept all data operation requests submitted to the one or more networked data storage devices.

In another form, there is provided a method and system for non-disruptive storage caching using spliced connections with packet inspection intelligence. As disclosed, a network cache appliance is provided for accelerating read and write requests from one or more storage clients for one or more files residing at one or more networked storage devices. The network cache appliance includes a tiered memory cache system for providing low-latency access in responding to read and write requests comprising a first cache storage for storing business critical data under control of a policy engine that is managed independently from the one or more networked storage devices. In selected embodiments, the tiered memory cache system is implemented as a dynamic and non-volatile cache memory for providing low-latency access in responding to read and write requests, and a cache controller for caching files in the cache memory using a predetermined cache policy. The network cache appliance also includes a packet inspection module for inspecting a read or write request sent using an IP-based network protocol to determine if the request should be passed to the tiered memory cache system or forwarded to a networked storage device for further processing. In selected embodiments, the packet inspection module is implemented with a packet processor coupled to the tiered memory cache system, and a network switch interconnect coupled between the one or more I/O ports, the packet processor and the tiered memory cache system for routing network protocol traffic between the one or more storage clients and the one or more networked storage devices. In other embodiments, the packet inspection module is capable of accepting user-specified cache profile to thereby provide preferential access to the cache memory for files from a user-specified application data set according to a predetermined set of pattern searching and/or content matching.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive storage caching using spliced connections with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for caching data operations, comprising:
   receiving at a standalone cache unit a request from a remote client to perform a specified data operation at one or more networked data storage devices;
   inspecting packet parameters in each TCP/IP stack layer associated with the request to determine if the request can be serviced with data from the one or more networked data storage devices that is stored in a cache memory located at the standalone cache unit;
   forwarding the request to the one or more networked data storage devices if the request cannot be serviced by the cache memory located at the standalone cache unit;
   performing the specified data operation on the data from the one or more networked data storage devices that is stored at the cache memory located at the standalone cache unit if the request can be serviced by the cache memory located at the standalone cache unit; and
   splicing connections between the remote client and the one or more networked data storage devices, where splicing connections comprises splicing only a connection state, a source sequence number and a destination sequence number in an L4 layer.

2. The method of claim 1, where splicing connections comprises splicing some, but not all, of all of the packet parameters in the TCP/IP stack so as to be transparent to the client and the one or more networked data storage devices.

3. The method of claim 1, where splicing connections comprises splicing connections between the one or more networked data storage devices and the remote client so as to be transparent to L3 and L4 network layers defining a connection.

4. The method of claim 1, where performing the specified data operation at the cache memory comprises caching files in the cache memory using a predetermined cache policy.

5. The method of claim 4, where the predetermined cache policy comprises a least recently used with dual time reference algorithm aided with greedy dual size frequency algorithm.

6. The method of claim 1, where inspecting packet parameters comprises transparently monitoring NFS and CIFS traffic between the remote client and the one or more networked data storage devices.

7. The method of claim 1, further comprising caching files in the cache memory located at the standalone cache unit using dynamically adjustable cache policies that reflect application workloads that change over time.

* * * * *